(12) United States Patent
DeCusatis et al.

(10) Patent No.: US 9,577,929 B2
(45) Date of Patent: Feb. 21, 2017

(54) VIRTUAL MACHINE NETWORK CONTROLLER

(71) Applicant: International Business Machines Corporation, Armonk, NY (US)

(72) Inventors: Casimer M. DeCusatis, Poughkeepsie, NY (US); Keshav G. Kamble, Fremont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/059,495

(22) Filed: Mar. 3, 2016

(65) Prior Publication Data

US 2016/0191381 A1   Jun. 30, 2016

Related U.S. Application Data

(63) Continuation of application No. 14/501,371, filed on Sep. 30, 2014, now Pat. No. 9,363,176, which is a continuation of application No. 14/134,185, filed on Dec. 19, 2013, now Pat. No. 9,300,580.

(51) Int. Cl.
| | |
|---|---|
| *H04L 12/46* | (2006.01) |
| *H04L 12/741* | (2013.01) |
| *H04L 12/721* | (2013.01) |
| *H04L 12/931* | (2013.01) |

(52) U.S. Cl.
CPC .......... *H04L 45/74* (2013.01); *H04L 12/4633* (2013.01); *H04L 12/4641* (2013.01); *H04L 12/4666* (2013.01); *H04L 45/38* (2013.01); *H04L 49/70* (2013.01)

(58) Field of Classification Search
None
See application file for complete search history.

(56) References Cited

U.S. PATENT DOCUMENTS

| | | |
|---|---|---|
| 6,862,265 B1 | 3/2005 | Appala et al. |
| 2005/0281279 A1 | 12/2005 | Dennison et al. |
| 2012/0320921 A1 | 12/2012 | Barnes et al. |
| 2013/0254891 A1 | 9/2013 | Onoda |
| 2013/0297768 A1 | 11/2013 | Singh |
| 2013/0304917 A1 | 11/2013 | Mittal et al. |
| 2013/0311663 A1 | 11/2013 | Kamath et al. |

(Continued)

FOREIGN PATENT DOCUMENTS

| | | |
|---|---|---|
| JP | 2005328281 A | 11/2005 |
| WO | 2010127948 A1 | 11/2010 |

OTHER PUBLICATIONS

International Search Report and Written Opinion for PCT Application No. PCT/JP2014/005187, dated Dec. 22, 2014, pp. 1-9.

(Continued)

*Primary Examiner* — Alex Skripnikov
(74) *Attorney, Agent, or Firm* — Cantor Colburn LLP; Steven Chiu

(57) ABSTRACT

Embodiments relate to virtual networks. An aspect includes a method for controlling a virtual network including analyzing header content of packet traffic, where the packet traffic corresponds to one or more virtual machines run on a computer. The method includes performing flow routing of the packet traffic through a virtual network based on the analyzing overlay virtual network identifiers or virtual extensible local area network (VXLAN) identifiers in the header content.

13 Claims, 4 Drawing Sheets

(56) References Cited

U.S. PATENT DOCUMENTS

2014/0050223 A1   2/2014  Foo et al.
2014/0195695 A1   7/2014  Okita
2014/0208317 A1   7/2014  Nakagawa
2015/0012621 A1   1/2015  Patwardhan et al.
2015/0109923 A1   4/2015  Hwang

OTHER PUBLICATIONS

Nikkei Network, vol. 157, Figures 2-2, 2-4, and 3-5, pp. 34-47, Apr. 28, 2013.

VIRTUAL MACHINE NETWORK CONTROLLER

DOMESTIC PRIORITY

This application is a continuation of U.S. patent application Ser. No. 14/501,371, filed Sep. 30, 2014, which is a continuation of U.S. patent application Ser. No. 14/134,185, filed Dec. 19, 2013, the disclosure of which is incorporated by reference herein in its entirety.

BACKGROUND

The present invention relates generally to networks of a system including virtual machines, and more specifically, to a virtual machine network controller.

Network virtualization creates a virtual network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. Tunnels are implemented by encapsulating packets transmitted by a source end station into an overlay header that transports the packet from the source switch to a target switch via an internet protocol (IP)-based network. In addition to this tunneling mechanism, the edge switches participate in an address discovery protocol, which may be learning/flooding based, or lookup-based.

Overlay networks like Virtual eXtensible Local Area Network (VXLAN) connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels. VXLAN tunnels are created by encapsulating data packets with VXLAN identifiers, which identify the tunnel through which the data packets are to flow.

SUMMARY

Aspects relate to a computer-implemented method for controlling a virtual network. The method includes analyzing, by a controller, header content of packet traffic, the packet traffic corresponding to one or more virtual machines run on a computer. The method further includes performing, by the controller, flow routing of the packet traffic through a virtual network based on the analyzing overlay virtual network identifiers or virtual extensible local area network (VXLAN) identifiers in the header content.

Additional aspects relate to a computer program product for implementing a virtual network. The computer program product includes a tangible storage medium readable by a processing circuit of a controller and storing instructions for execution by the processing circuit for performing a method. The method includes analyzing, by the controller, header content of packet traffic, the packet traffic corresponding to one or more virtual machines run on a computer. The method further includes performing, by the controller, flow routing of the packet traffic through a virtual network based on the analyzing an overlay virtual network identifiers or virtual extensible local area network (VXLAN) identifiers in the header content.

Additional aspects relate to a computer system for implementing a virtual network. The system includes a computer configured to generate packet traffic to be transmitted over a network and a controller connected to the computer and configured to receive the packet traffic. The controller is configured to analyze header content of the packet traffic corresponding to one or more virtual machines run on the computer. The controller is also configured to perform flow routing of the packet traffic through a virtual network based on the analyzing overlay virtual network identifiers or virtual extensible local area network (VXLAN) identifiers of the header content.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Overlay Virtual network systems encapsulate packets with VXLAN headers to tunnel the packets through a network to desired destinations. Embodiments of the invention relate to providing a controller to filter packet traffic from a computer and control the flow of the packet traffic over a virtual network.

Figure 1:
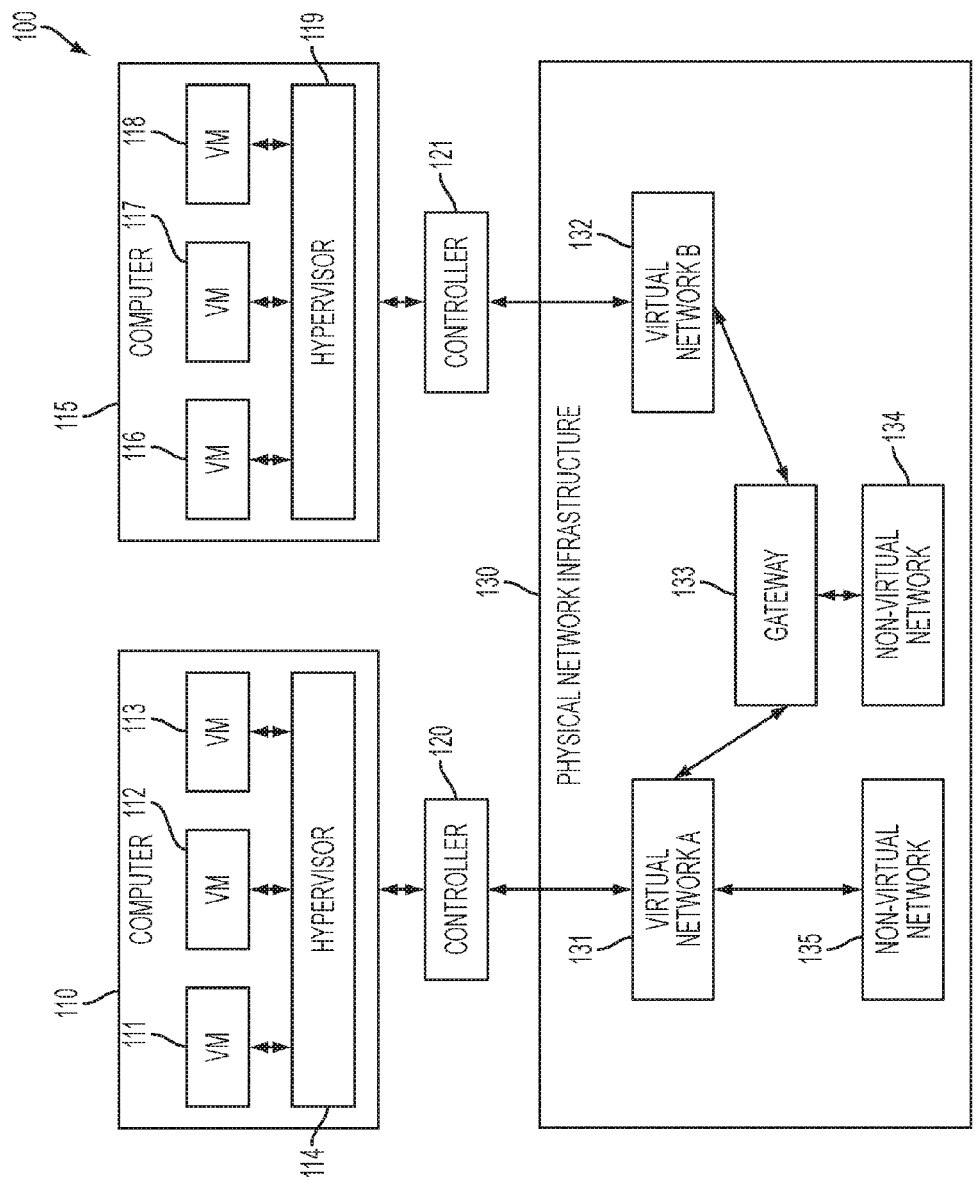
FIG. 1 depicts an overlay network in accordance with one embodiment.

Turning now to FIG. 1, a conceptual view of an overlay network 100 is shown. The overlay network 100 includes computers 110 and 115, including virtual machines 111, 112, and 113, and 116, 117, and 118. The overlay network 100 also includes a physical network infrastructure 130, which defines a virtual network 131 and a virtual network 132. The physical network infrastructure 130 may also include a gateway 133 to provide a connection between the virtual networks 131 and 132 and the non-virtual networks 134 and 135.

The network infrastructure functionality typically associated with and/or used in a network infrastructure, including switches, connectors, wires, circuits, cables, servers, hosts, storage media, operating systems, applications, ports, I/O devices, etc. The network infrastructure 130 supports at least one non-virtual network 134 or 135, which may be, for example, a legacy network.

Each virtual network 131 and 132 may use any number of virtual machines 111 to 118. In one embodiment, one or more virtual machines 111, 112, and 113 are run on a first computer 110 and one or more virtual machines 116, 117, and 118 are run on, or controlled by, a second computer 115. The first computer 110 includes a hypervisor 114 that manages the flow of data between the virtual machines 111 to 113 and the physical network infrastructure 130. Likewise, the second computer 115 includes a hypervisor 119 that manages the flow of data between the virtual machines 116 to 118 and the physical network infrastructure 130.

According to one embodiment, the overlay network 100 may tunnel through one or more cell switched domain scalable fabric components (SFCs) interconnected with one or more distributed line cards (DLCs).

Components of an overlay network 100 typically identify where to route packets based on a virtual network identifier, referred to as a VNI or VNID. This is typically a 24-bit code or number. The overlay network 100 has the capability of tunneling layer-2 packets over the layer-3 network by encapsulating the layer-2 packets into an overlay header. This may be performed using Virtual eXtensible Local Area Network (VXLAN) or some other overlay capable protocol, such as locator/ID separation protocol (LISP), overlay transport virtualization (OTV), or NVGRE etc. The packet may also be encapsulated in a user datagram protocol (UDP) and internet protocol (IP) UDP/IP header. The overlay network 100 may include one or more point-to-point tunnels, and/or point-to-multi-point tunnels. In addition, any of these tunnels may be created, removed, altered and modified based on any number of factors, such as new devices being added to the overlay network 100, removal of devices from the overlay network 100, and startup of any end devices, such as devices managing tunnel end points, virtual overlay network gateways, hypervisors, switches capable of overlay functionality, etc. In order for a device to manage a tunnel, there needs to be a mapping between an original packet's source address, destination address, and a tunnel identifier. In this way, a physical server is capable of forwarding the encapsulated original packet to the proper destination device.

In embodiments of the invention, one or more controllers 120 and 121 are located along a packet flow path from the computers 110 and 115 to the virtual networks 131 and 132 and the non-virtual networks 134 and 135. The one or more controllers 120 and 121 may be software controllers, or controllers comprising a software program executed by one or more processors in a computer. Alternatively, the one or more controllers 120 and 121 may be hardware controllers comprising physical circuitry, or combinations of software and hardware controllers.

In one embodiment, the one or more controllers 120 and 121 are configured to analyze header content of every new packet traffic flow from the one or more virtual machines 111-113 and 116-118. The one or more controllers 120 and 121 are further configured to perform flow routing of the packet traffic through the one or more virtual networks 131 and 132 based on the analysis of the header content.

In one embodiment, the one or more controllers 120 and 121 perform the flow routing of the packet traffic by identifying VXLAN identifiers in the header content of packets of the packet traffic and control the flow of the packet traffic based on the VXLAN identifier. In one embodiment, the one or more controllers 120 and 121 perform the flow routing of the packet traffic by comparing the VXLAN identifiers to data stored in a table, and by directing the packet traffic based on the data stored in the table. The table may include, for example, a plurality of virtual network identifiers and their latency and bandwidth requirements including QoS policies and the one or more controllers 120 and 121 may perform the flow routing by assigning different packets to different virtual networks based on different VXLAN identifiers of the different packets.

In one embodiment, the one or more controllers 120 and 121 are configured to analyze the header content of packet traffic output from the computers 110 and 115, identifies packet traffic having VXLAN headers, and performs the flow routing of the packet traffic having VXLAN headers based on content in the VXLAN headers.

In one embodiment, the one or more controllers 120 and 121 are configured to perform the flow routing by determining that the header content includes one or more non-VXLAN destinations, such as a computer in one of the non-virtual networks 134 and 135. In one embodiment, the one or more controllers 120 and 121 are configured to translate a VXLAN identifier in the header content into a virtual local area network (VLAN) identifier to allow the non-VXLAN destination to process the packet traffic. In other words, the controller 120 may act as a gateway, bypassing the gateway 133 in the physical network infrastructure 130, or replacing the gateway 133, such that the physical network infrastructure would not require or include a gateway to permit packet flow from virtual machines 111 to 113 or 116 to 118 to the non-virtual networks 134 and 135.

In yet another embodiment, the one or more controllers 120 or 121 may create waypoints in the physical network infrastructure through which packet traffic must flow. For example, the physical network infrastructure 130 may include one or more switches, physical or software firewalls maintained by one or more computers, such as servers, or any other devices, and the one or more controllers 120 or 121 may designate the one or more physical or software elements as waypoints through which the packet traffic must flow.

In one embodiment, the one or more controllers 120 or 121 query VXLAN switches in a virtual network, such as the virtual networks 131 and 132 to determine the topologies of the virtual networks 131 and 132. Based on the determined topologies, the one or more controllers 120 or 121 may obtain a global view of the virtual networks 131 or 132 or the physical network infrastructure 130 to identify addresses for ports leading to different elements in the networks 131, 132, or 130 to direct packet traffic through the networks 131, 132, or 130 as per the packet's latency and bandwidth requirements.

Figure 2:
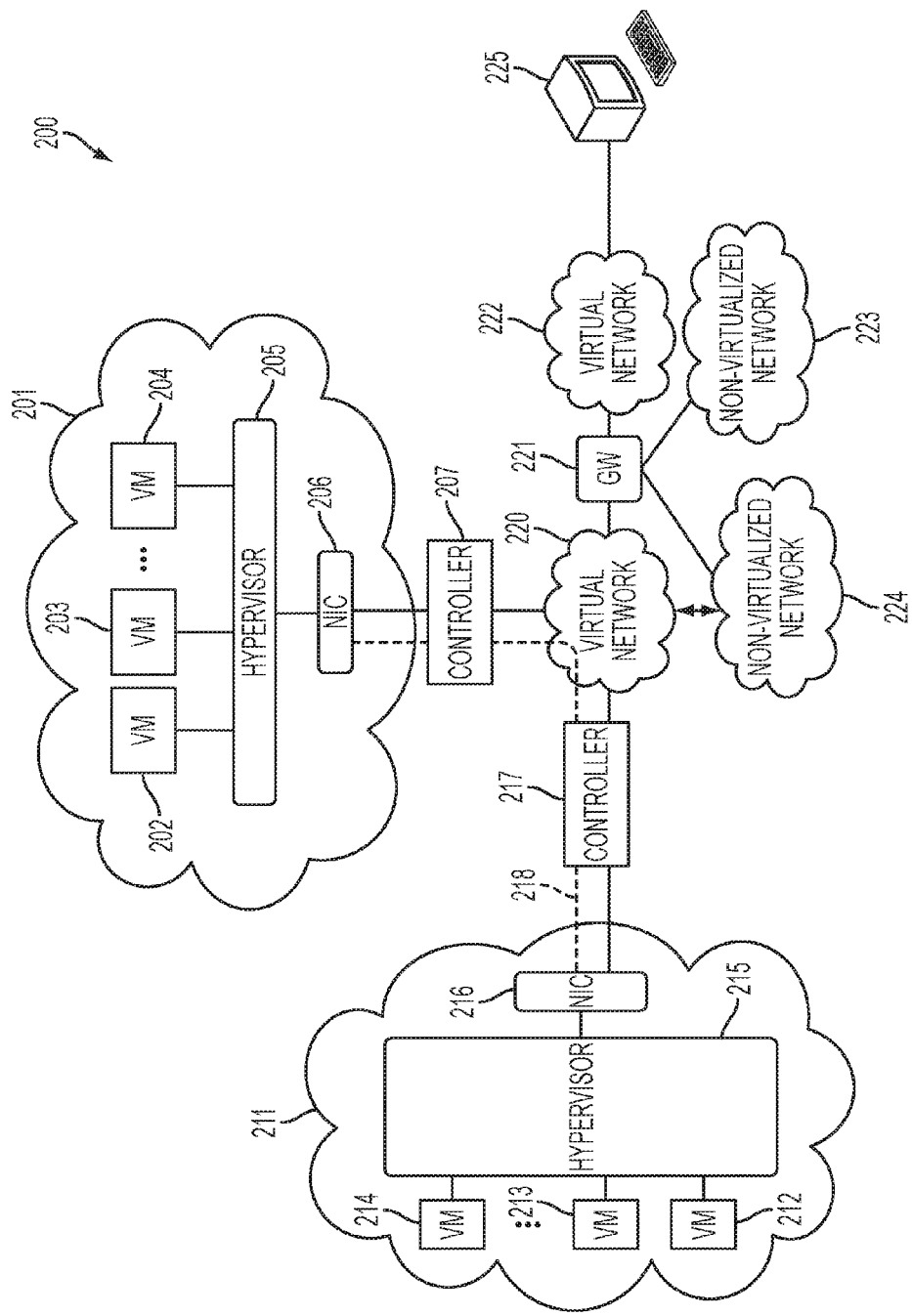
FIG. 2 depicts a virtual network system in accordance with another embodiment.

FIG. 2 illustrates a system 200 according to one embodiment of the invention. The system 200 includes one or more networks 201 and 211 including virtual machines 202, 203, and 204 connected to a hypervisor 205 and virtual machines 212, 213, and 214 connected to the hypervisor 215. The hypervisors 205 and 215 may be connected to network interface cards 206 and 216 to facilitate communication between the hypervisors 205 and 215 and the virtual network 220, such as by adding header content to the packet flow. As illustrated in FIG. 2, hypervisors 205 and 215 are capable of tunneling 218 through the virtual network 220 to each other. Although only one tunnel 218 is illustrated in FIG. 2, embodiments of the invention encompass any number of tunnels, sources, and destinations, or locations where tunnels originate and terminate.

Each hypervisor 205 and 215 may be connected to any number of virtual machines 202, 203, 204, 212, 213, and 214. In addition, network interface cards 206 and 216 may be located downstream of the hypervisors 205 and 215, between the hypervisors 205 and 215 and the virtual network 220. In one embodiment, the system 200 includes a virtual overlay network gateway 221 to interface between virtual networks 220 and 222 and the non-virtualized networks 223 and 224. In another embodiment, as discussed above, the one or more controllers 207 and 217 may act as gateways in place of the gateway 221.

In one embodiment, the system 200 includes a server 225 or other endpoints, or destination nodes of the data packets generated by the virtual machines 202 to 204 and 212 to 214.

Similar to the overlay network 100 illustrated in FIG. 1, the system 200 includes one or more controllers 207 and 217 positioned between the networks 201 and 211 and the virtual network 220. The controllers 207 and 217 are configured to filter the packet flows from the virtual machines 202 to 204 and 212 to 214, to analyze header content of packets in the packet flow, and to control the flow of the packets through the virtual networks 220 and 222 based on the header content.

While FIG. 2 illustrates two separate controllers 207 and 217, embodiments of the invention encompass a single controller that filters packet traffic from multiple different hypervisors. Likewise, embodiments of the invention encompass systems having more than two controllers.

Figure 3:
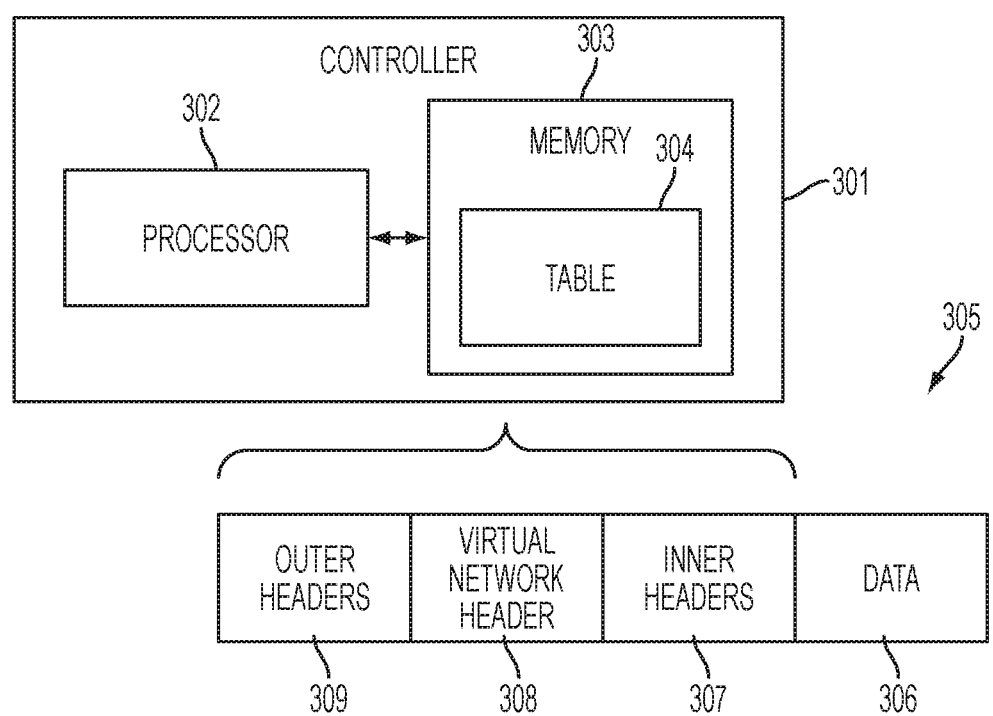
FIG. 3 depicts a controller and data packet according to one embodiment.

FIG. 3 illustrates an example of a controller 301 and data packet 305 according to an embodiment of the invention. The controller 301 includes a processor 302 and memory 303. The memory 303 has stored therein a table 304. The data packet 305 includes data 306, inner headers 307, one or more virtual network headers 308, such as VXLAN headers, and outer headers 309. The headers 307 to 309 include header content, such as flag fields, VXLAN segment IDs, a source address, destination address, a media access control (MAC) address, data regarding a type or length of the data, and any other information for identifying and transmitting data in a virtual network.

In one embodiment, the controller 301 performs flow routing of the packet 305 by identifying a VXLAN identifier in the header content of packet 305, and the controller 301 controls the flow of the packet 305 in a network based on the VXLAN identifier. In one embodiment, the controller 301 performs the flow routing of the packet 305 by comparing the VXLAN identifier to data stored in the table 304, and by directing the packet 305 based on the data stored in the table 304.

The table 304 may include, for example, a plurality of virtual network identifiers, associated QoS policies, latency and bandwidth requirements and the controller 301 may perform the flow routing by assigning different packets to different virtual networks based on different VXLAN identifiers of the different packets. In one embodiment of the invention, the table 304 matches header content, such as the VXLAN identifier or other header content of the packet 305 with header content in the table 304 and routes the header through a virtual network based on the identified header content of the packet 305 and policies specified in the table 304. For example, the table 304 may also include identifiers of one or more virtual switches, physical switches, firewalls, or any other elements of a virtual network, such that the controller 301 routes the packet 305 through the virtual network including the virtual network elements in the table 304 based on the identified header content. In embodiments of the invention, the table 304 includes any data for performing flow routing through tunnels in the virtual network including virtual network IDs, associated forwarding information, QoS policies, bandwidth and latency requirements, waypoint service policies, virtual LAN IDs for non-virtualized network forwarding tables, etc.

Figure 4:
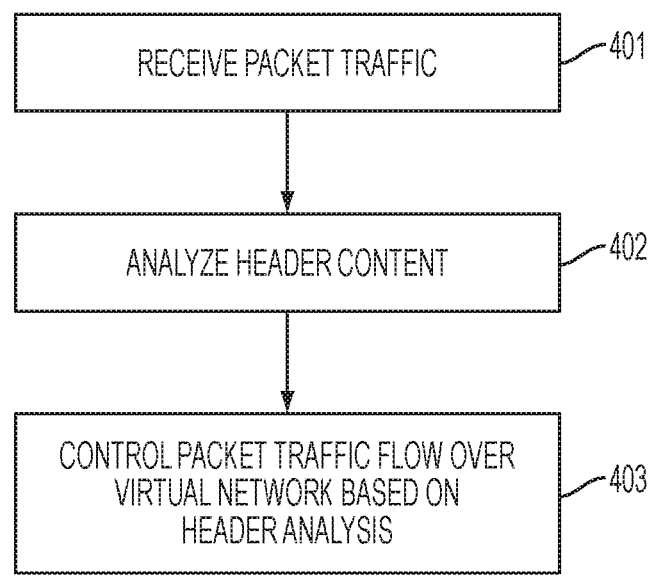
FIG. 4 is a flow diagram of a method for controlling data packet flow according to one embodiment.

FIG. 4 is a flow diagram of a method according to an embodiment of the invention. In block 401, packet traffic is received by a controller. In particular, a virtual machine in a computer, server, mainframe, or other computing device may generate packet data and a flow of packet traffic. The controller may be located between the computer and a virtual network, and may receive the packet traffic after the packet traffic leaves the computing device and before the packet traffic enters the virtual network.

In block 402, the controller analyzes the header content of the packet traffic. For example, the controller may analyze a VXLAN ID of the header content or any other header content.

In block 403, the controller controls packet traffic flow over a virtual network based on analyzing the header analysis. For example, the controller may perform the flow routing by sending a packet flow through particular physical or virtual elements of a physical network or a virtual network. In one embodiment, the controller determines that the header content includes one or more non-VXLAN destinations. In one embodiment, the controller translates a VXLAN identifier in the header content into a virtual local area network (VLAN) identifier to allow the non-VXLAN destination to process the packet traffic. In one embodiment, the controller creates waypoints in the physical network infrastructure through which packet traffic must flow.

According to embodiments of the invention, methods or systems analyze the header content of packet traffic with a controller and control traffic flow of the packet traffic through a virtual network based on analyzing the header content.

Technical effects and benefits include increasing the efficiency of the flow of packet traffic through virtual networks by utilizing a controller to coordinate and control the flow of packet traffic.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device (s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for controlling a virtual network, the method comprising:

analyzing, by a controller, header content of packet traffic, the packet traffic corresponding to one or more virtual machines run on a computer;

querying, by the controller, a plurality of virtual extensible local area network (VXLAN) switches being different from the controller so as to determine at least one topology of the virtual network, and in response to determining the at least one topology, identifying at least one address corresponding to the at least one port so as to direct the packet traffic therethrough; and performing, by the controller, flow routing of the packet traffic through a virtual network based on the analyzing overlay virtual network identifiers or virtual extensible local area network (VXLAN) identifiers in the header content, the flow routing of the packet traffic including identifying the overlay virtual network identifiers or VXLAN identifiers in the header content of packets of the packet traffic, and controlling and forwarding the flow of the packet traffic based on the overlay virtual network identifiers or VXLAN identifiers, wherein the controller performs the flow routing of the packet traffic by assigning different packets to different virtual networks based on different overlay virtual network identifiers or VXLAN identifiers of the different packets and forwarding based on bandwidth, and latency requirements of the different packet, comparing the overlay virtual network identifiers or VXLAN identifiers to data stored in the table that includes a plurality of virtual network identifiers, and directing the packet traffic based on the data stored in the table.

2. The computer-implemented method of claim 1, wherein the controller analyzes the header content of packet traffic output from the computer, identifies packet traffic having overlay virtual network headers or VXLAN headers, and performs the flow routing of the packet traffic having the overlay virtual network headers or VXLAN headers based on content in the overlay virtual network headers or the VXLAN headers.

3. The computer-implemented method of claim 1, wherein performing the flow routing comprises:

determining that the header content includes a non-overlay virtual network destination or non-VXLAN destination; and translating the overlay virtual network identifiers or VXLAN identifiers in the header content into a virtual local area network (VLAN) identifier to allow the non-overlay virtual network destination or the non-VXLAN destination to process the packet traffic.

4. The computer-implemented method of claim 1, further comprising:
creating, by the controller, waypoints in a network through which packet traffic must flow; and
routing, by the controller, the packet traffic through the waypoints.

5. The computer-implemented method of claim 1, wherein packets included in the packet traffic are directed to the virtual network via a corresponding port based on a latency and bandwidth requirement of the packets.

6. The computer-implemented method of claim 1, further comprising bypassing a gateway so as to route the flow of packet traffic from the one or more virtual machines to at least one non-virtual network in signal communication with the virtual network.

7. The computer-implemented method of claim 1, wherein a physical network infrastructure supports the one or more virtual machines and the at least one non-virtual network, and wherein the physical network excludes any gateways such that the controller routes the flow of packet traffic from the one or more virtual machines to at least one non-virtual network in signal communication with the virtual network.

8. A computer program product for implementing a virtual network, the computer program product comprising:
a tangible non-transitory storage medium readable by a processing circuit of a controller and storing instructions for execution by the processing circuit for performing a method comprising:
analyzing, by the controller, header content of packet traffic, the packet traffic corresponding to one or more virtual machines run on a computer;
querying, by the controller, a plurality of virtual extensible local area network (VXLAN) switches being different from the controller so as to determine at least one topology of the virtual network, and in response to determining the at least one topology, identifying at least one address corresponding to the at least one port so as to direct packet traffic therethrough; and
performing, by the controller, flow routing of the packet traffic through a virtual network based on the analyzing overlay virtual network identifiers or virtual extensible local area network (VXLAN) identifiers in the header content, the flow routing of the packet traffic including identifying the overlay virtual network identifiers or VXLAN identifiers in the header content of packets of the packet traffic, and controlling and forwarding the flow of the packet traffic based on the overlay virtual network identifiers or VXLAN identifiers,
wherein the controller performs the flow routing of the packet traffic by assigning different packets to different virtual networks based on different overlay virtual network identifiers or VXLAN identifiers of the different packets and forwarding based on bandwidth, and latency requirements of the different packet, comparing the overlay virtual network identifiers or VXLAN identifiers to data stored in the table that includes a plurality of virtual network identifiers, and directing the packet traffic based on the data stored in the table.

9. The computer program product of claim 8, wherein the controller analyzes the header content of packet traffic output from the computer, identifies packet traffic having overlay virtual network identifiers or VXLAN headers, and performs the flow routing of the packet traffic having overlay virtual network headers or VXLAN headers based on content in the overlay virtual network headers or VXLAN headers.

10. The computer program product of claim 8, wherein performing the flow routing comprises:
determining that the header content includes a non-overlay virtual network or non-VXLAN destination; and
translating the overlay virtual network identifiers or VXLAN identifiers in the header content into virtual local area network (VLAN) identifiers to allow the non-overlay virtual network or non-VXLAN destination to process the packet traffic.

11. The computer program product of claim 8, further comprising:
creating, by the controller, waypoints in a network through which packet traffic must flow; and
routing, by the controller, the packet traffic through the waypoints.

12. The computer program product of claim 8, wherein performing the flow routing includes bypassing a gateway so as to route the flow of packet traffic from the one or more virtual machines to at least one non-virtual network in signal communication with the virtual network.

13. The computer program product of claim 8, wherein a physical network infrastructure supports the one or more virtual machines and the at least one non-virtual network, and wherein the physical network excludes any gateways such that the controller routes the flow of packet traffic from the one or more virtual machines to at least one non-virtual network in signal communication with the virtual network.

* * * * *